(12) United States Patent
Babu et al.

(10) Patent No.: US 11,966,498 B2
(45) Date of Patent: Apr. 23, 2024

(54) SYSTEM AND METHOD FOR AT-SOURCE MASKING OF SENSITIVE DATA

(71) Applicant: Tata Consultancy Services Limited, Mumbai (IN)

(72) Inventors: Nandita Babu, Pune (IN); Ashim Roy, Pune (IN); Shirish Damle, Pune (IN); Rupali Kulkarni, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 387 days.

(21) Appl. No.: 17/465,770

(22) Filed: Sep. 2, 2021

(65) Prior Publication Data
US 2022/0188457 A1    Jun. 16, 2022

(30) Foreign Application Priority Data

Dec. 16, 2020   (IN) .............................. 202021054800

(51) Int. Cl.
*G06F 21/62*   (2013.01)
*G06F 16/22*   (2019.01)
*G06F 16/242*  (2019.01)

(52) U.S. Cl.
CPC ...... *G06F 21/6254* (2013.01); *G06F 16/2282* (2019.01); *G06F 16/2438* (2019.01)

(58) Field of Classification Search
CPC ............. G06F 21/6254; G06F 16/2282; G06F 16/2438
See application file for complete search history.

(56) References Cited

U.S. PATENT DOCUMENTS

| | | | |
|---|---|---|---|
| 7,974,942 B2 | 7/2011 | Pomroy et al. | |
| 8,156,159 B2 | 4/2012 | Ebrahimi et al. | |
| 2009/0049511 A1* | 2/2009 | Manickam | G06F 21/6254 726/1 |
| 2010/0042643 A1* | 2/2010 | Pattabhi | G06F 16/256 707/E17.005 |
| 2010/0318489 A1* | 12/2010 | De Barros | G06N 5/04 706/50 |
| 2012/0197919 A1* | 8/2012 | Chen | G06F 16/221 707/E17.005 |
| 2012/0246696 A1* | 9/2012 | Boukobza | G06F 21/6245 726/1 |
| 2014/0344958 A1* | 11/2014 | Boukobza | G06F 16/24534 726/30 |

(Continued)

*Primary Examiner* — Darshan I Dhruv
(74) *Attorney, Agent, or Firm* — FINNEGAN, HENDERSON, FARABOW, GARRETT & DUNNER LLP

(57) ABSTRACT

This disclosure relates to a system and method for at source data masking and discovery of unique identifier for at-source masking. The method reads a table of production database comprising sensitive column from a source database for at source data masking. A unique identifier column is identified, and a temporary table is created which has three or more columns. Columns of temporary table comprises a sensitive column from the table of production database, a column for masked data of sensitive column and a unique identifier column. Sensitive column of the temporary table is masked using a known masking technique and the original data of the sensitive column and the masked data of the sensitive column is inserted into the temporary table. Finally, the production database is updated with the masked data of the sensitive column.

5 Claims, 6 Drawing Sheets

(56) References Cited

U.S. PATENT DOCUMENTS

| | | | |
|---|---|---|---|
| 2017/0323119 A1* | 11/2017 | Harp | G06F 21/6254 |
| 2020/0125667 A1* | 4/2020 | Sonawane | G06F 16/252 |
| 2020/0143082 A1* | 5/2020 | Dubishar | G06F 16/221 |
| 2021/0021603 A1* | 1/2021 | Gibbons | G06F 16/221 |

* cited by examiner

SYSTEM AND METHOD FOR AT-SOURCE MASKING OF SENSITIVE DATA

CROSS-REFERENCE TO RELATED APPLICATIONS AND PRIORITY

This U.S. patent application claims priority under 35 U.S.C. § 119 to India Application No. 202021054800, filed on Dec. 16, 2020. The entire content of the abovementioned application is incorporated herein by reference.

TECHNICAL FIELD

The disclosure herein generally relates to a field of data masking and, more particularly, a system and method for at-source masking of sensitive data of various applications at a production database.

BACKGROUND

Masking techniques for masking data which is sensitive for sharing and disclosing are vastly used for a variety of applications. Masking techniques are used for data testing applications where a real or an original data is masked against disclosure during the testing phase. Further, in recent years, various companies across the globe have progressed to outsource their work to other companies within or outside their countries. With the work being outsourced, companies need to share a variety of data outside, for example, over a network, for execution of tasks by the support or offshore teams. The shared data may include data of customers which may be sensitive for sharing and disclosing. Typically, encryption techniques and administrative controls are employed to allow only authorized users to view such data. However, in some cases even the authorized users should not view all of the data and the sensitive data may have to be protected from disclosure.

Nowadays, ensuring data integrity across all the applications of an enterprise and also providing high utility and sanitized data for an effective and privacy-compliant test environment is challenging. In the masking process, the masking module connects to the source or production database, applies masking to the sensitive data of column of application table and the result is then loaded into the target server. Organizations stores the result of masking as flat files. These flat files serve as an SQL dump, which comprises of the masked sensitive data and unmasked insensitive data. This masked dump can be directly loaded into target database. Thus, the destination database does not contain sensitive data and target database can be the same source or can be different target database. Key business problems of existing data masking approach are such as longer masking cycle, data security issues, heavy resource cost, change in data configuration and redundant data processing.

SUMMARY

Embodiments of the present disclosure provides technological improvements as solutions to one or more of the above-mentioned technical problems recognized by the inventors in conventional systems. For example, in one embodiment, a system and method for at-source masking of sensitive data of various applications is provided.

In one aspect, a processor-implemented method for at-source masking of sensitive data of various applications is provided. The method includes one or more steps as receiving a response output comprising columns, based on a user request, from a production database table. Further, the method comprises identifying a column with at least one unique identifier, based on the response output, for masking sensitive data of the column with the at least one unique identifier in the response output. Further, the method includes creating at least one temporary table comprising three or more columns, wherein a pseudo-column of the production database which is static, and the pseudo-column is a unique identifier. It would be appreciated that the at least one column of the temporary table comprising the sensitive data of the production database. The at least one column with unique identifier and masking the at least one column of the temporary table with sensitive data using predefined masking rules. Herein, the at least one column is created using the production database function for auto-population of a sequential values. The method identifying at least one unique key in the table to create a unique identifier column and insert unique values by iterating over the sensitive unique key and creating a unique column using an external code. Further, the method includes inserting the masked column of the temporary table in the production database and updating the production database with masked data of the temporary column, wherein the temporary table comprising the identified unique column, original data of sensitive column and masked data of sensitive column for at source data masking.

In another embodiment, a system for at-source masking of sensitive data of various applications is provided. The system includes an input/output interface for receiving a response output comprising a sensitive data, based on a user request, from a production database table, one or more hardware processors, and a memory in communication with the one or more hardware processors. The one or more hardware processors are configured to execute programmed instructions stored in the memory to identify a column with at least one unique identifier, based on the response output, for masking of the sensitive data in the response output to create at least one temporary table comprising three or more columns, wherein at least one column of the temporary table comprising the sensitive data of the production database. Further, the system is configured to mask the at least one column of the temporary table with sensitive data using predefined masking rules to insert the masked column of the temporary table in the production database. Therefore, update the production database with masked data of the temporary column, wherein the temporary table comprising the identified unique column, original data of sensitive column and masked data of sensitive column for at source data masking.

In yet another embodiment, a non-transitory computer readable medium storing one or more instructions which when executed by one or more processors on a system cause the one or more processors to perform the method is provided. The method includes one or more steps as receiving a response output comprising columns, based on a user request, from a production database table. Further, the method comprises identifying a column with at least one unique identifier, based on the response output, for masking sensitive data of the column with the at least one unique identifier in the response output. Further, the method includes creating at least one temporary table comprising three or more columns, wherein a pseudo-column of the production database which is static, and the pseudo-column is a unique identifier. It would be appreciated that the at least one column of the temporary table comprising the sensitive data of the production database. The at least one column with unique identifier and masking the at least one column of the temporary table with sensitive data using predefined masking rules. Herein, the at least one column is created using the production database function for auto-population of a sequential values. The method identifying at least one unique key in the table to create a unique identifier column and insert unique values by iterating over the sensitive unique key and creating a unique column using an external code. Further, the method includes inserting the masked column of the temporary table in the production database and updating the production database with masked data of the temporary column, wherein the temporary table comprising the identified unique column, original data of sensitive column and masked data of sensitive column for at source data masking.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
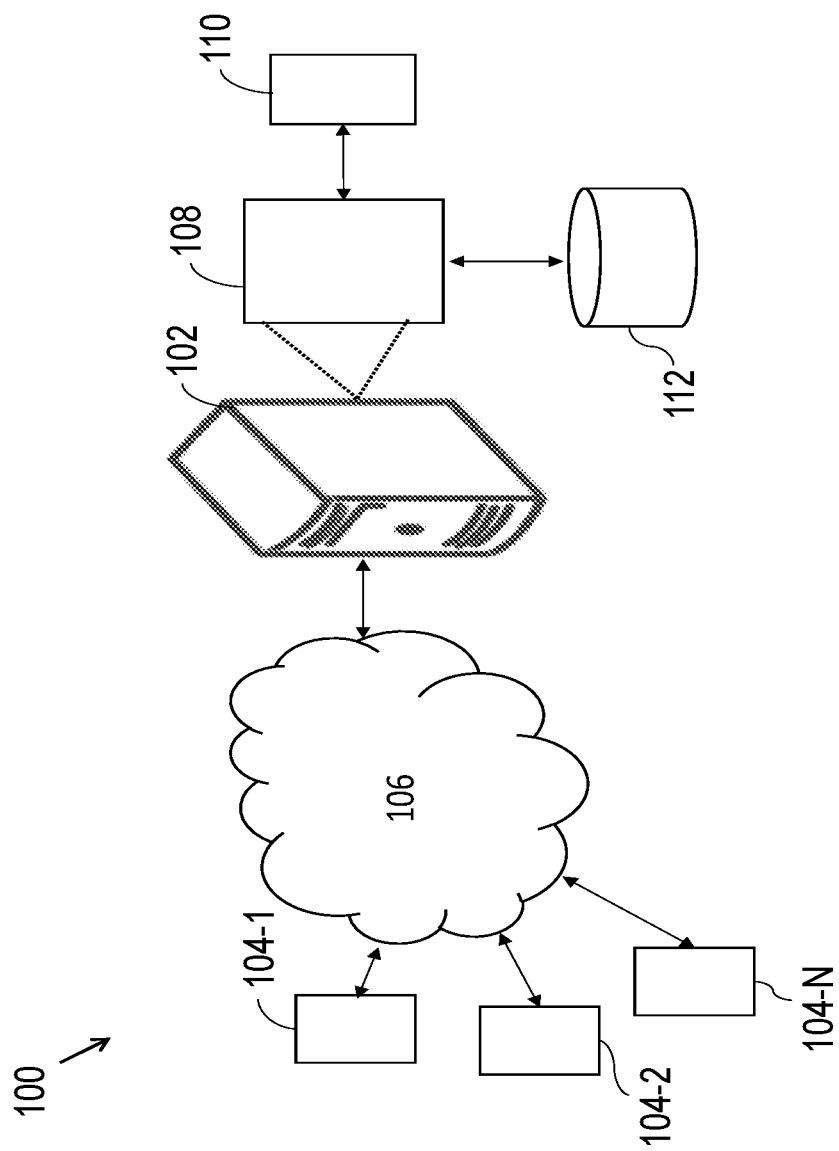
FIG. 1 is an exemplary system for at-source data masking of sensitive data present in applications, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes, which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The embodiments herein provide a method and a system for at source masking of sensitive data of applications. A database may be a client list database with tables storing information about the client names and other personally identifiable information (PII) and various non-PII. The database may be stored on a cloud server, an on-premise server, a network-based server that is accessible over the internet etc. The system is configured to allow a user to use a data masking user interface to request various masking operations.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 illustrates a block diagram of a system (100) for at source data masking of sensitive data of applications, in accordance with an example embodiment. Although the present disclosure is explained considering that the system (100) is implemented on a server, it may be understood that the system (100) may comprises one or more computing devices (102), such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface (104). Examples of the I/O interface (104) may include, but are not limited to, a user interface, a portable computer, a personal digital assistant, a handheld device, a smartphone, a tablet computer, a workstation, and the like. The I/O interface (104) are communicatively coupled to the system (100) through a network (106).

In an embodiment, the network (106) may be a wireless or a wired network, or a combination thereof. In an example, the network (106) can be implemented as a computer network, as one of the different types of networks, such as virtual private network (VPN), intranet, local area network (LAN), wide area network (WAN), the internet, and such. The network (106) may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network (106) may include a variety of network devices, including routers, bridges, servers, computing devices, storage devices. The network devices within the network (106) may interact with the system (100) through communication links.

The system (100) supports various connectivity options such as BLUETOOTH®, USB, ZigBee and other cellular services. The network environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. The components and functionalities of the system (100) are described further in detail.

Figure 2:
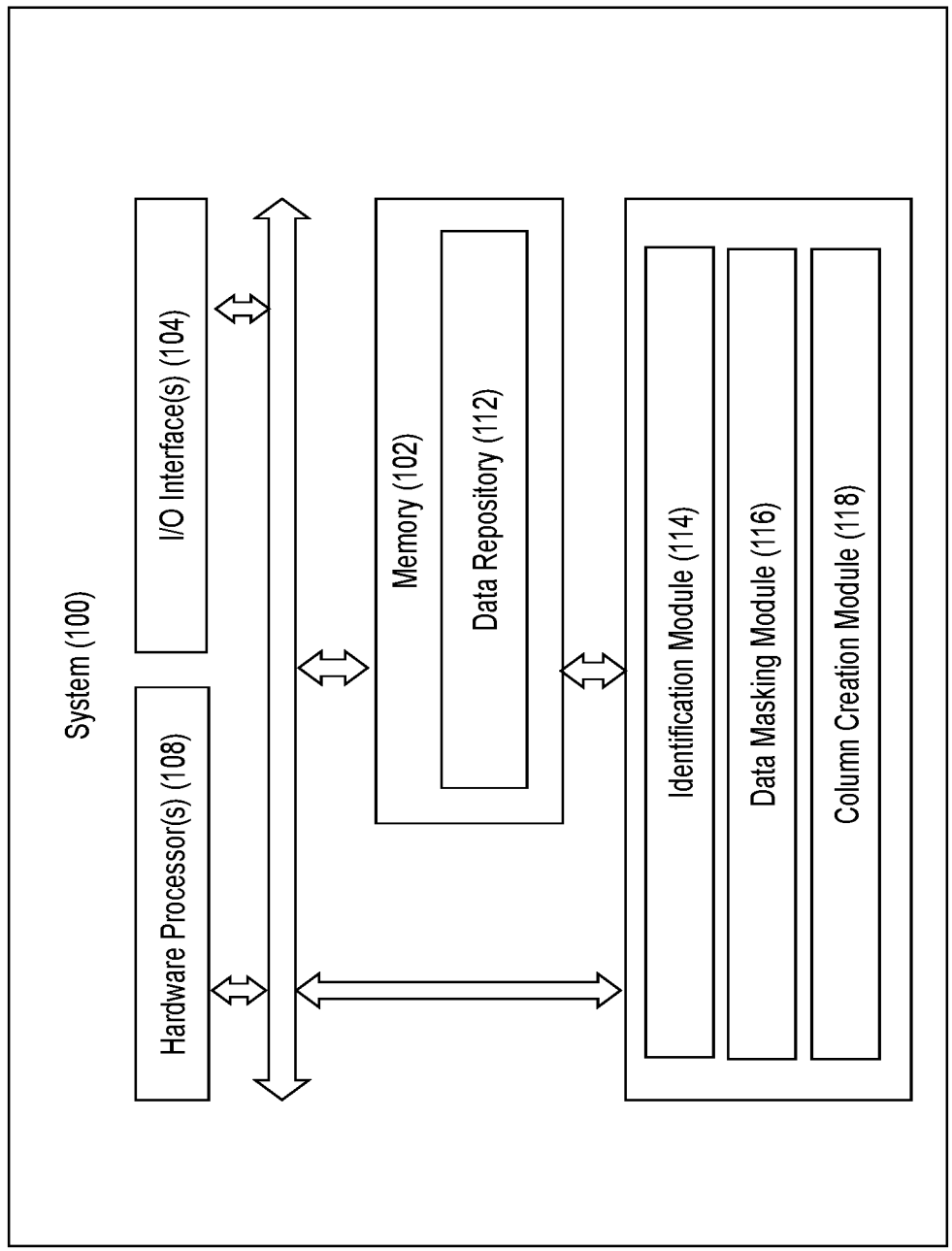
FIG. 2 illustrates a functional architecture of a system for at-source data masking of sensitive data of applications, in accordance with some embodiments of the present disclosure.

Referring FIG. 2, wherein the system (100) may be implemented in a workstation, a mainframe computer, a server, and a network server. In an embodiment, the computing device (102) further comprises one or more hardware processors (108), one or more memory (110), hereinafter referred as a memory (110) and a data repository (112), for example, a repository (112). The memory (110) is in communication with the one or more hardware processors (108), wherein the one or more hardware processors (108) are configured to execute programmed instructions stored in the memory (110), to perform various functions as explained in the later part of the disclosure. The repository (112) may store data processed, received, and generated by the system (100). Further, the system includes an identification module (114), data masking module (116) and column creation module (118). Herein, the input/output interface (106) of the system (100) receives a response output comprising a sensitive data, based on a user request, from a table of a production database.

In the preferred embodiment of the disclosure, the identification module (114) of the system (100) is configured to identify a column with at least one unique identifier, based on the response output, for masking of the sensitive data in the response output from the table of the production database. For every table to be masked, the system (100) identifies the unique column that uniquely identifies every row of the table. This can be an existing primary key, unique key or pseudo-column of the table. In the absence of a valid key columns, the system (100) is configured to determine a unique column in the table. The system (100) follows two process to determine the unique column. In a reuse process, an existing entity of the table is identified as unique identifier column. Hence, no metadata change is done to the table. In a create new process, a new unique column is introduced in the table which acts as unique identifier. In this process, the metadata change takes place.

It is to be noted that the one or more production databases provide pseudo columns that store addresses of the row. It is to be noted that the pseudo column value is unique and a case of reuse. However, the value of the pseudo column is very volatile in one or more production databases. In such one or ore production databases, the pseudo column cannot be used as unique identifier column. For example, in an Oracle database the pseudo column returns address of a row and uniquely identifies a row in the production database and is static as well. If the pseudo column is not selected, then the system (100) is configured to check for any key column i.e. primary or unique key that would not be masked. This is also a reuse process.

In another aspect, the system (100) is configured to have access to the configuration and the shape of the data in a production database. A communication layer of the system (100) is configured to communicate with the data masking user interface to allow a user to generate masking configuration for one or more columns of the production database. The system (100) communicates a request for the masking operation to a data masking module (116). The data masking module (116) may be implemented on the server side where it can access the production database and work with the system (100) to affect the masking operations requested by the user.

It is to be noted that the at-source masking of sensitive data is used when source and target database are same. Herein, the original data is never persisted outside the production database, even in the lifecycle of masking process. For every table to be masked, the system (100) is configured to identify a unique column that uniquely identifies every row of the table. This can be an existing primary key or unique key of the table. In the absence of a valid key columns, an identification module (114) of the system (100) is configured to determine at least one unique column in the table. The identification module (114) comprises of a few prioritize options to find the unique column. It would be appreciated that the priority options are loosely bound, and the priorities can be changed as per user's requirement.

It is to be noted that the system (100) is configured to identify unique identifier is not restricted to any specific type of production database, it is applicable for all relational database management systems (RDBMS). For example, in an oracle database a pseudo column that stores the address of a row is known as "ROWID" and this column is static and hence is identified as a unique identifier (UID). The value of this column does not change in the table even after data manipulation language (DML) operations such as insert, and update are performed on the table. However, in other production database such as postgreSQL, MS SQL Server, MySQL, Teradata, DB2 etc. the pseudo column is volatile and does not qualify for UID.

Further, wherein the table of the production database has a primary or unique key or unique index that is non-sensitive, or it is not part of masking request, then one or more columns of the production database are identified as UID. It would be appreciated that it is applicable to all the production databases. If the table does not have primary or unique key or unique indexes, or these keys are sensitive i.e. the column/columns of these keys are part of masking request, then the system (100) looks for another option for UID.

In one aspect, creation of a unique additional column in the original table is opted. The column creation module (118) of the system (100) is configured to create an auto-increment column with unique sequential values. Illustrative example of auto-increment column in one or more production databases are:
  a) Identity data type—Oracle, MS SQL Server, Db2, Teradata
  b) serial datatype—PostgreSQL
  c) Auto-increment datatype—MySQL Furthermore, wherein an additional column is added by executing data definition language (DDL) operation, the table of the production database are altered. For example:
  a) SQL query For MySQL:
    ALTER TABLE EmployeeTab ADD DM_UID_COL INTEGER NOT NULL AUTO_INCREMENT, ADD UNIQUE INDEX DM_INDX (DM_UID_COL)
  b) SQL query For DB2:
    ALTER TABLE EmployeeTab ADD COLUMN DM_UID_COL INTEGER GENERATED BY DEFAULT as IDENTITY (start with 1)

Through the above query in a table "EmployeeTab, an additional column "DM_UID_COL" is added which is an auto-increment column.

It is to be noted that some of the production database put restrictions on using auto-increment column. For example, in SQL Server and MySQL, if there is an existing auto-increment column present in the table of these production databases, then addition of new auto-increment column is not allowed. However, TeraData database does not allow to add auto-increment column in the existing table. If the creation of auto-increment column is not allowed, then the system (100) is configured to create a column and populate data by using database function. Herein, the populated data may be unique but not necessarily sequential. In one example, of such database functions and the relevant types as follows:
  a) Unique identifier data type—MS SQL Server, MySQL
  b) Function—newID ( ), UUID In another embodiment, the system (100) is configured to first create a new column in the table by executing a query and populate data in the new column by using database functions. For example, in MySQL:
ALTER TABLE EmployeeTab ADD DM_UID_COL VARCHAR(36)
UPDATE EmployeeTab DM_UID_COL=uuid( )

In yet another embodiment, wherein there is a sensitive key in the table, the system (100) may use this sensitive key to create an additional column in the table that acts as UID column. The data type of the created additional column would be an integer and the additional column contains sequential value starting from 1 to row count of the original table. Firstly, herein, the original table is altered, and an integer column is added to the table. Secondly, the created additional column is updated by setting sequential value by iterating over the sensitive key column values. The created additional column is selected as UID.

In another embodiment of the disclosure, the system (100) is configured to create the unique column using the external code. Herein, the external code is configured to generate unique identifier for each row of the table. The external code can be plugged into the system through a flexible place holder configuration. The external code will primarily use current cursor functionality of the database.

Figure 3:
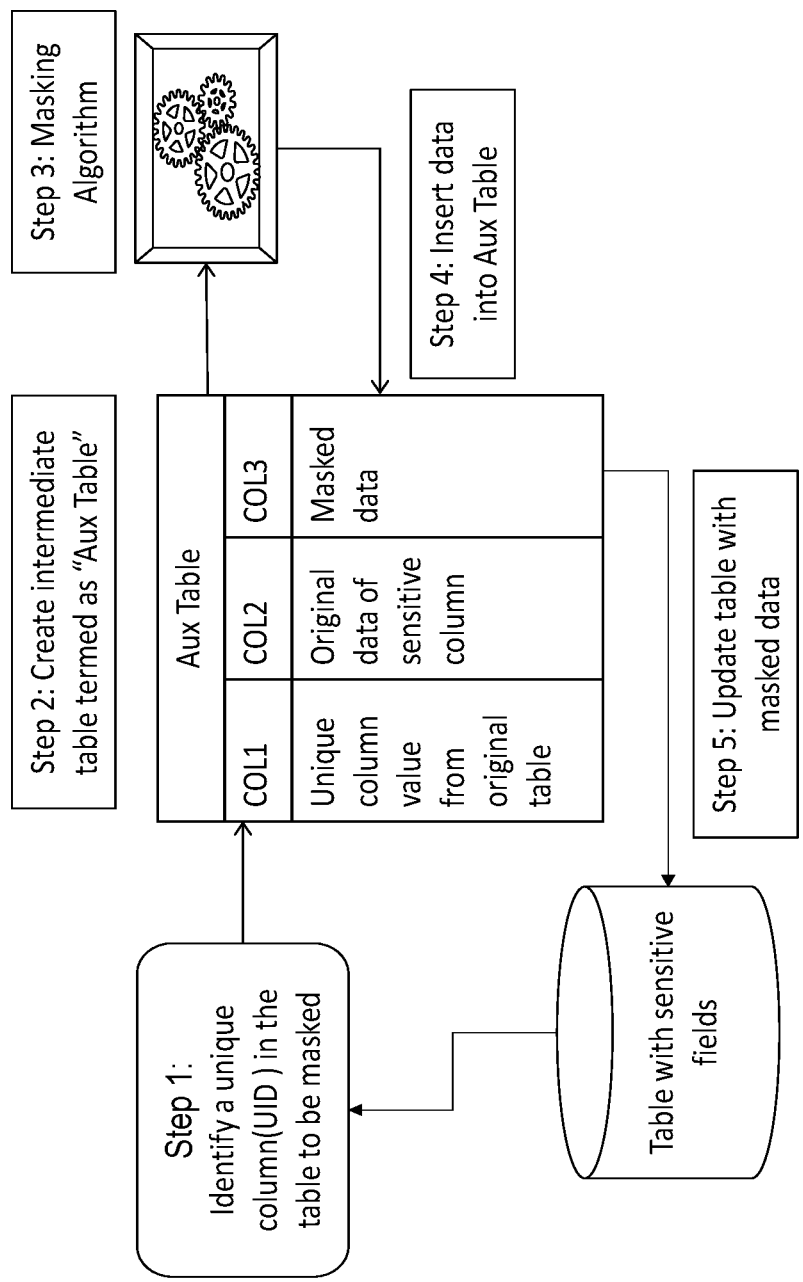
FIG. 3 illustrates a block diagram of the system for at-source data masking of sensitive data applications, in accordance with some embodiments of the present disclosure.

Referring FIG. 3 illustrating a functional block diagram (300) for identifying a column with at least one unique identifier. Herein, the system (100) is configured to identify a column with at least one unique identifier from the table of the production database. Each production database provides a plurality of pseudo columns that store the addresses of row of the table of the production database and the column value is unique. However, in one or more production database, the value of this column is very volatile and the value changes due to some internal databases operation such as insert, delete etc. In such database vendor, pseudo column cannot be used as unique identifier column. Hence, if the pseudo-column is static, then this column is selected as unique identifier column, otherwise the system is configured to find non-sensitive key of the column.

It is apparent that every database has concept of primary key, unique key, or unique indexes. The column or group of columns in the table can be defined as primary key or unique key or unique indexes. These key types have one common characteristic, the column or columns defined as these key types must contain unique values. The column/columns cannot have duplicate values. Thus, they uniquely identify each record in a table. Upon receiving request for masking of sensitive columns, the system checks if the column/columns of the primary key or unique key or unique indexes are part of masking request. If the masking request contains these key columns, then they are identified as sensitive key otherwise they are identified as non-sensitive. Further, the system (100) checks if a primary key or unique key or unique indexes are present in the table of the production database.

Referring table 1, in one example, wherein "EmployeeTab" contains a primary key column i.e. EMP_ID and the primary key column is not part of masking request and hence may not be masked. The system is configured to identify EMP_ID as UID and the search stop there.

TABLE 1

| EMP_ID (PK) | Name | Phone Number | SEQID |
|---|---|---|---|
| 31160 | Sneha Seth | 7653443876 | 500 |
| 31161 | Arogya Verma | 7453493876 | 501 |
| 31167 | Subh Jain | 8653443879 | 605 |

TABLE 1-continued

| EMP_ID (PK) | Name | Phone Number | SEQID |
|---|---|---|---|
| 31168 | Rena Mathur | 9652113876 | 608 |
| 31169 | Gogai Raj | 9087652345 | 123 |

Figure 4A:
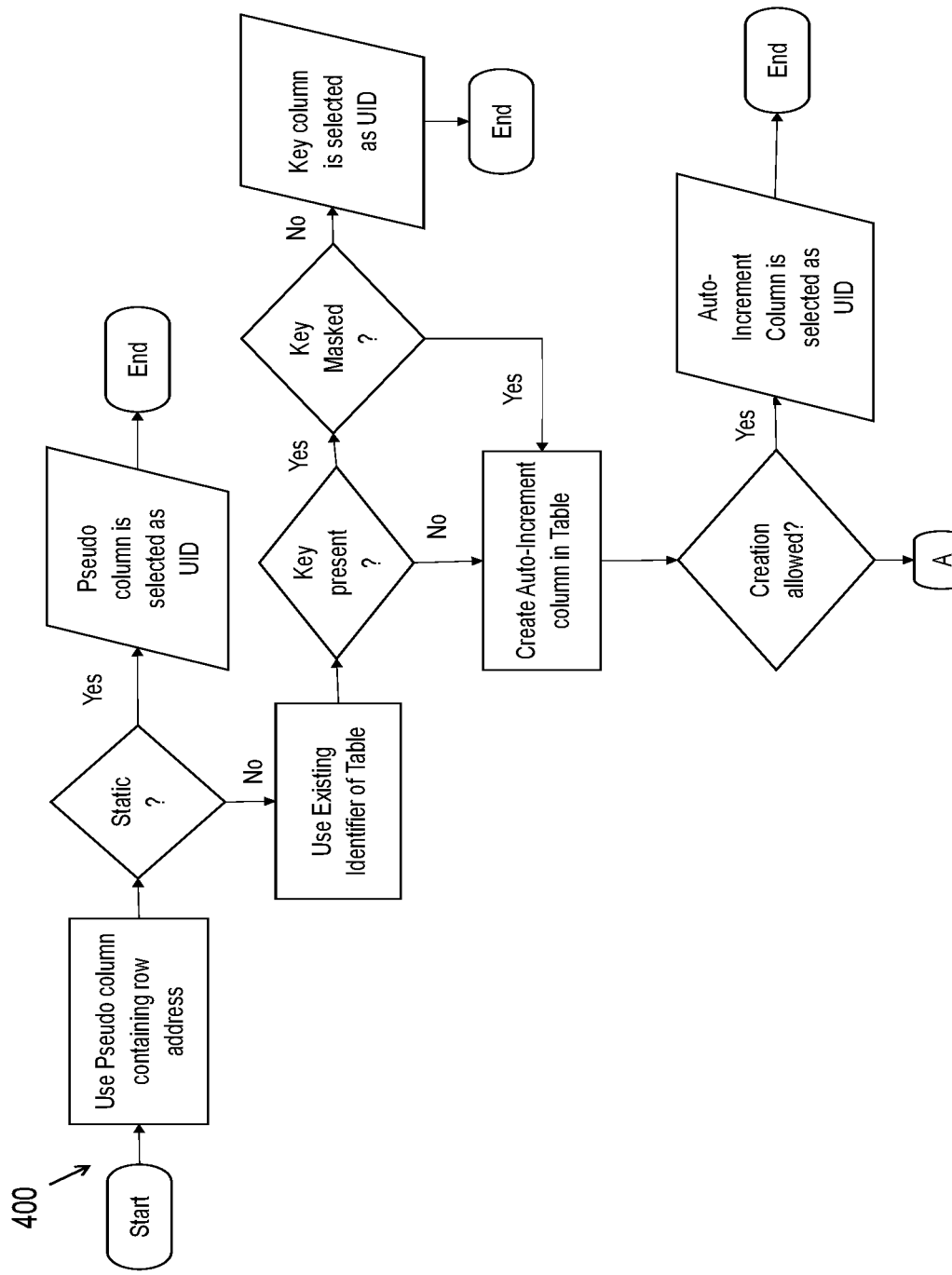
FIGS. 4(a) & 4(b) illustrate a flow diagram to identify unique identifiers of a table of the production database, in accordance with some embodiments of the present disclosure.
Figure 4B:
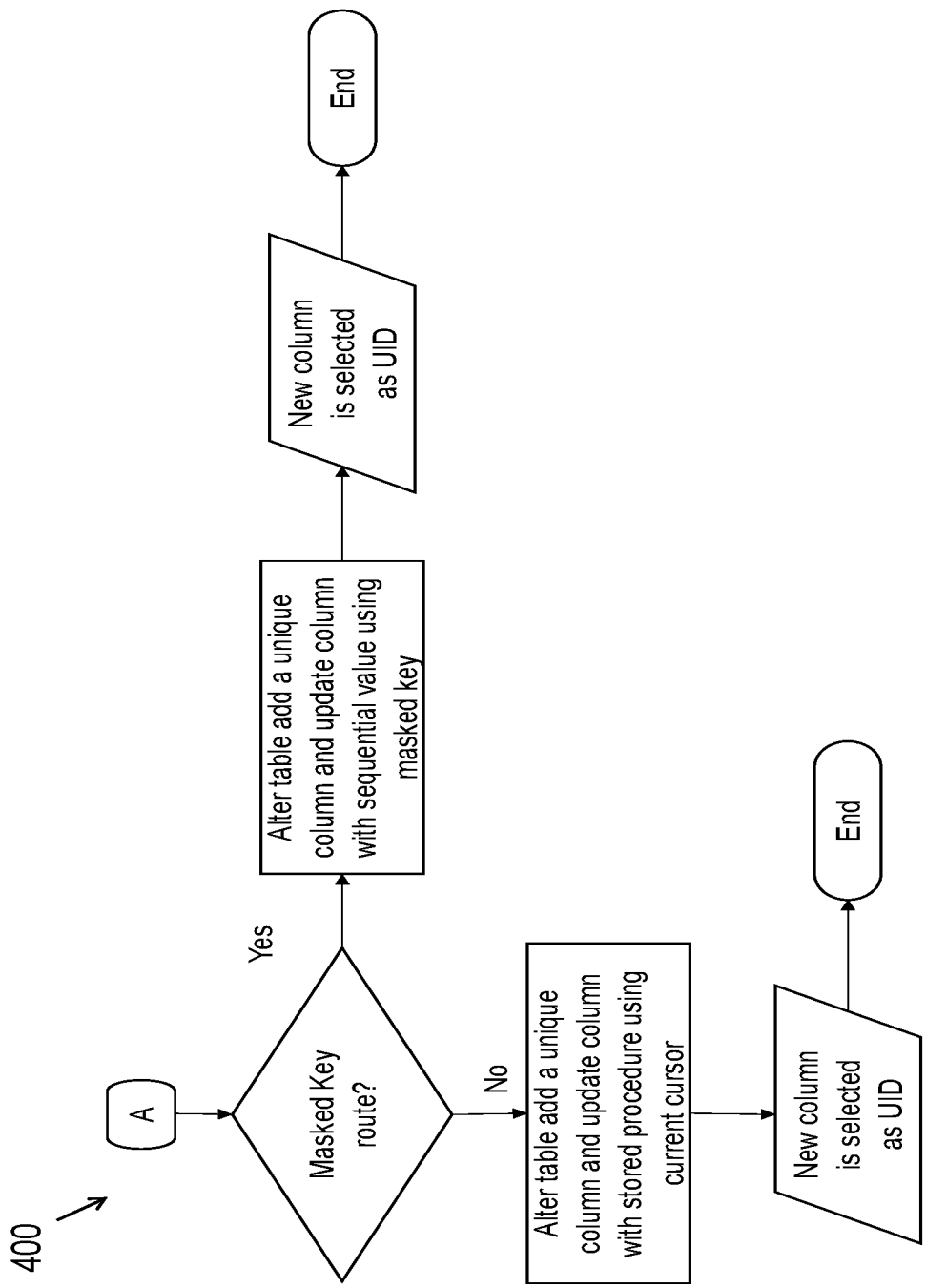

Referring FIG. 4(a) & (b), illustrating a flow diagram (400) for creating a first additional column based on auto-increment in the predefined table that would be unique. Herein, the system (100) is configured to create an auto-increment column with unique sequential value. As this is auto-sequential column, the data gets automatically populated with unique values. After the column is added, a unique index is enforced on this column.

Referring table 2 & 3, as an example, wherein the table contains a primary key column i.e. EMP_ID and this column is part of masking request and hence will be masked. The system (100) may reject EMP_ID as UID. In such cases, creation of a unique additional column in the original table is opted. The system (100) creates an auto-increment column with unique sequential value. The additional column is added by executing DDL operation to alter table.

TABLE 2

| EMP_ID (PK) | Name | Phone Number | SEQID |
|---|---|---|---|
| 31160 | Sneha Seth | 7653443876 | 500 |
| 31161 | Arogya Verma | 7453493876 | 501 |
| 31167 | Subh Jain | 8653443879 | 605 |
| 31168 | Rena Mathur | 9652113876 | 608 |
| 31169 | Gogai Raj | 9087652345 | 123 |

After the additional column is added by executing the alter query, the values for DM_UID_COL are unique in all rows and they are sequential starting from 1 and DM_UID_COL is identified as UID.

TABLE 3

| EMP_ID (PK) | NAME | PHONE | SEQID | DM_UID_COL |
|---|---|---|---|---|
| 31160 | Sneha Seth | 7653443876 | 500 | 1 |
| 31161 | Arogya Verma | 7453493876 | 501 | 2 |
| 31167 | Subh Jain | 8653443879 | 605 | 3 |
| 31168 | Rena Mathur | 9652113876 | 608 | 4 |
| 31169 | Gogai Raj | 9087652345 | 123 | 5 |

However, there are one or more production databases have restrictions on using auto-increment column and the first additional column creation in the predefined table is not allowed, then the system is configured to create a second additional column based on a database function to populate the data. In the database function, the populated data in the second additional column is unique but not a sequential data. As explained in a table 4, SEQID is an auto-increment column, so here creation of a new auto-increment column may not be allowed. The system may find out that the table 4 already has an auto-increment column, so the system may check if it can use database function to populate data. If database function is available, the system may create a new column in the table and populate data by using database function.

TABLE 4

| EMP_ID (PK) | Name | Phone Number | SEQID |
|---|---|---|---|
| 31160 | Sneha Seth | 7653443876 | 500 |
| 31161 | Arogya Verma | 7453493876 | 501 |
| 31167 | Subh Jain | 8653443879 | 605 |
| 31168 | Rena Mathur | 9652113876 | 608 |
| 31169 | Gogai Raj | 9087652345 | 123 |

Further, the structure after creation and population of data below in a table 5.

TABLE 5

| EMP_ID (PK) | Name | Phone Number | SEQID | DM_UID_COL |
|---|---|---|---|---|
| 31160 | Sneha Seth | 7653443876 | 500 | axdfgh |
| 31161 | Arogya Verma | 7453493876 | 501 | bxdfgh |
| 31167 | Subh Jain | 8653443879 | 605 | cxdfgh |
| 31168 | Rena Mathur | 9652113876 | 608 | dxdfgh |
| 31169 | Gogai Raj | 9087652345 | 123 | exdfgh |

In another embodiment of the disclosure, the system (100) is configured to identify a sensitive key in the given columns of the predefined table to create the additional column in the predefined table. Herein, the column with sensitive key is known an UID column. The type of the UID column would be integer and this column may contain sequential value starting from 1 to row count of the original table. The system (100) may alter the predefined table and add an integer column and then update this column and set sequential value by integrating over the sensitive unique key column values. However, if the predefined table does not have any unique key, then the system may create a unique column using an external code.

Referring tables 6 & 7, as an example, wherein the system (100) may alter table 6 and add a new column of data type integer. The table 7 populate this column with sequential value starting from 1 to row count of the table by performing update operation using the key.

TABLE 6

| EMP_ID (PK) | Name | Phone Number | SEQID | DM_UID_COL |
|---|---|---|---|---|
| 31160 | Sneha Seth | 7653443876 | 500 | |
| 31161 | Arogya Verma | 7453493876 | 501 | |
| 31167 | Subh Jain | 8653443879 | 605 | |
| 31168 | Rena Mathur | 9652113876 | 608 | |
| 31169 | Gogai Raj | 9087652345 | 123 | |

TABLE 7

| EMP_ID (PK) | Name | Phone Number | SEQID | DM_UID_COL |
|---|---|---|---|---|
| 31160 | Sneha Seth | 7653443876 | 500 | 1 |
| 31161 | Arogya Verma | 7453493876 | 501 | 2 |
| 31167 | Subh Jain | 8653443879 | 605 | 3 |
| 31168 | Rena Mathur | 9652113876 | 608 | 4 |
| 31169 | Gogai Raj | 9087652345 | 123 | 5 |

In another embodiment of the disclosure, the system (100) is configured to create the unique column using the external code. Herein, the external code is configured to generate unique identifier for each row of the table. The external code can be plugged into the system through a flexible place holder configuration. The external code will primarily use current cursor functionality of the database. The default external code used is a stored procedure which uses the "where current of cursor" functionality of the database. A cursor is a pointer to data that allows an Embedded SQL program to perform an operation on the record pointed to. By using a cursor, Embedded SQL can iterate through a result set. Before the external code is executed, the system (100) creates an additional column in the original table. Alter table add a new column i.e. DM_UID_COL of data type Integer.

TABLE 8

| EMP_ID (PK) | Name | Phone Number | SEQID | DM_UID_COL |
|---|---|---|---|---|
| 31160 | Sneha Seth | 7653443876 | 500 | |
| 31161 | Arogya Verma | 7453493876 | 501 | |
| 31167 | Subh Jain | 8653443879 | 605 | |
| 31168 | Rena Mathur | 9652113876 | 608 | |
| 31169 | Gogai Raj | 9087652345 | 123 | |

TABLE 9

| EMP_ID (PK) | NAME | PHONE | SEQID | DM_UID_COL |
|---|---|---|---|---|
| 31160 | Sneha Seth | 7653443876 | 500 | 1 |
| 31161 | Arogya Verma | 7453493876 | 501 | 2 |
| 31167 | Subh Jain | 8653443879 | 605 | 3 |
| 31168 | Rena Mathur | 9652113876 | 608 | 4 |
| 31169 | Gogai Raj | 9087652345 | 123 | 5 |

Figure 5:
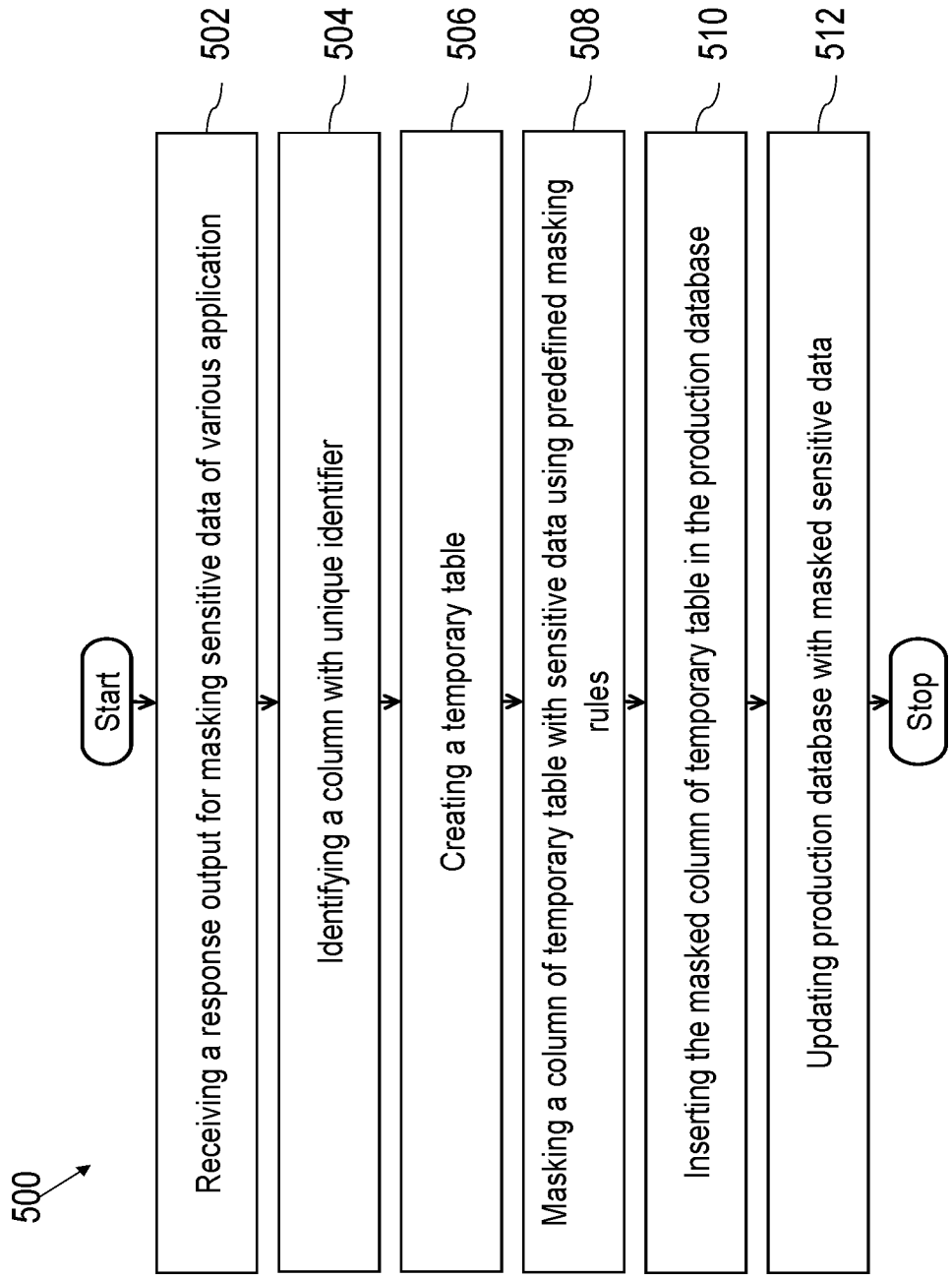
FIG. 5 illustrates a flow chart of a method for at source data masking of sensitive data of applications, in accordance with some embodiments of the present disclosure.

FIG. 5 illustrates a processor-implemented method (500) for at source data masking of sensitive data of applications. The method comprises one or more steps as follows.

In the preferred embodiment, at the step (502) a response output comprising a sensitive data is received, based on a user request, from a table of a production database.

In the preferred embodiment, at the next step (504) identifying a column with at least one unique identifier, based on the response output, for masking of the sensitive data in the response output. Wherein a pseudo-column of the predefined table is static, the pseudo-column is a unique identifier. Wherein at least one column of the production database with a non-sensitive key, the at least one column is a unique identifier. Further, wherein at least one column is created using a production database function for auto-population of a sequential values.

In the preferred embodiment, at the next step (506) creating at least one temporary table comprising three or more columns, wherein at least one column of the temporary table comprising the sensitive data of the production database. It is to be noted that the at least one unique key is identified in the table to create a unique identifier column and inserting unique values by iterating over the sensitive unique key.

In the preferred embodiment, at the next step (508) masking the at least one column of the temporary table with sensitive data using predefined masking rules.

In the preferred embodiment, at the next step (510) inserting the masked column of the temporary table in the production database.

In the preferred embodiment, at the last step (512) updating production database with masked data of the temporary column, wherein the temporary table comprising the identified unique column, original data of sensitive column and masked data of sensitive column for at source data masking.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of data security issues, heavy resource cost, redundant data processing, change in database configuration, and longer masking cycle. The system and method herein masking at data source avoiding data movement over network and removes need for additional infrastructure by using existing database server. Further, the embodiments provide processing of only sensitive fields needing masking keeping other columns untouched. Further, the system and method does not disable triggers during masking. Hence the business logic of triggers remains active and masked data propagates to linked tables. It is a data masking process with high performance needed to achieve data compliance in lesser time. Thus, enabling faster time to market for enterprises.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device, which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include each hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development would change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for masking data at-source comprising:
   receiving, via one or more hardware processors, a response output comprising a sensitive data, based on a user request, from a table of a production database;
   identifying, via the one or more hardware processors, a valid key column with at least one unique identifier from the table of the production database, based on the response output, for masking of sensitive data in the response output, wherein the valid key column includes a pseudo column, a primary key column or a unique key column which is not part of a masking request;
   in response to a restriction on creating a unique auto-increment column in the table of the production database using a production database function, creating, via the one or more hardware processors, the unique auto-increment column using a sensitive key present in the table of the production database, wherein the sensitive key is a part of the masking request, wherein data type of the created unique auto-increment column is an integer and the unique auto-increment column contains sequential values starting from one to row count of the table in the production database;
   in absence of the valid key column and failure of creation of the unique auto-increment column using the sensitive key in the table of the production database, creating the unique auto-increment column containing the unique identifier using an external code, wherein the external code generates the unique identifier for each row in the table of the production database;
   creating, via the one or more hardware processors, at least one temporary table comprising three or more columns by executing a data definition language (DDL) operation, wherein at least one column of the temporary table comprising the sensitive data of the production database;

masking, via the one or more hardware processors, the sensitive data of the at least one column of the temporary table using predefined masking rules;

inserting, via the one or more hardware processors, the at least one masked column of the temporary table in the production database; and updating, via the one or more hardware processors, the production database with masked sensitive data of the at least one column of the temporary column, wherein the temporary table comprising the identified valid key column with at least one unique identifier or the unique auto-increment column, original data of a sensitive key column and masked data of the sensitive key column for at-source data masking, wherein the sensitive key column is the primary key column or the unique key column, wherein the at-source data masking is used, when a source database and a target database are same.

2. The processor-implemented method of claim 1, further comprising a static pseudo-column in the production database, wherein the static pseudo-column is the unique identifier.

3. The processor-implemented method of claim 1, further comprising at least one column of the production database with a non-sensitive key, wherein the at least one column with the non-sensitive key is the unique identifier.

4. A system for masking data at-source comprising:
an input/output interface for receiving a response output comprising a sensitive data, based on a user request, from a table of a production database;
one or more hardware processors;
a memory in communication with the one or more hardware processors, wherein the one or more hardware processors are configured to execute programmed instructions stored in the memory, to:
  identify a valid key column with at least one unique identifier from the table of the production database, based on the response output, for masking of sensitive data in the response output, wherein the valid key column includes a pseudo column, a primary key column or a unique key column which is not part of a masking request;
  in response to a restriction on creating a unique auto-increment column in the table of the production database using a production database function, create the unique auto-increment column using a sensitive key present in the table of the production database, wherein the sensitive key is a part of the masking request, wherein data type of the created unique auto-increment column is an integer and the unique auto-increment column contains sequential values starting from one to row count of the table in the production database;
  in absence of the valid key column and failure of creation of the unique auto-increment column using the sensitive key in the table of the production database, create the unique auto-increment column containing the unique identifier using an external code, wherein the external code generates the unique identifier for each row in the table of the production database;
  create at least one temporary table comprising three or more columns by executing a data definition language (DDL) operation, wherein at least one column of the temporary table comprising the sensitive data of the production database;
  mask the sensitive data of the at least one column of the temporary table using predefined masking rules;
  insert the at least one masked column of the temporary table in the production database; and
  update the production database with masked sensitive data of the at least one column of the temporary column, wherein the temporary table comprising the identified valid key column with at least one unique identifier or the unique auto-increment column, original data of a sensitive key column and masked data of the sensitive key column for at-source data masking, wherein the sensitive key column is the primary key column or the unique key column, wherein the at-source data masking is used, when a source database and a target database are same.

5. A non-transitory computer readable medium storing one or more instructions which when executed by one or more processors on a system cause the one or more processors to perform the method for masking data at-source comprising:
receiving, via one or more hardware processors, a response output comprising a sensitive data, based on a user request, from a table of a production database;
identifying, via the one or more hardware processors, a valid key column with at least one unique identifier from the table of the production database, based on the response output, for masking of sensitive data in the response output, wherein the valid key column includes a pseudo column, a primary key column or a unique key column which is not part of a masking request;
in response to a restriction on creating a unique auto-increment column in the table of the production database using a production database function, creating, via the one or more hardware processors, the unique auto-increment column using a sensitive key present in the table of the production database, wherein the sensitive key is a part of the masking request, wherein data type of the created unique auto-increment column is an integer and the unique auto-increment column contains sequential values starting from one to row count of the table in the production database;
in absence of the valid key column and failure of creation of the unique auto-increment column using the sensitive key in the table of the production database, creating the unique auto-increment column containing the unique identifier using an external code, wherein the external code generates the unique identifier for each row in the table of the production database;
creating, via the one or more hardware processors, at least one temporary table comprising three or more columns by executing a data definition language (DDL) operation, wherein at least one column of the temporary table comprising the sensitive data of the production database;
masking, via the one or more hardware processors, the sensitive data of the at least one column of the temporary table using predefined masking rules;
inserting, via the one or more hardware processors, the at least one masked column of the temporary table in the production database; and
updating, via the one or more hardware processors, the production database with masked sensitive data of the at least one column of the temporary column, wherein the temporary table comprising the identified valid key column with at least one unique identifier or the unique auto-increment column, original data of a sensitive key column and masked data of the sensitive key column for at-source data masking, wherein the sensitive key column is the primary key column or the unique key column, wherein the at-source data masking is used, when a source database and a target database are same.

* * * * *